(12) United States Patent
Bachman et al.

(10) Patent No.: US 7,644,954 B2
(45) Date of Patent: Jan. 12, 2010

(54) MOBILE FLUID STORAGE AND SUPPLY APPARATUS AND METHOD

(75) Inventors: Todd Bachman, Parker, CO (US); Christopher B. Downs, Elizabeth, CO (US)

(73) Assignee: Western Environmental, LLC, Aurora, CO (US)

(*) Notice: Subject to any disclaimer, the term of this patent is extended or adjusted under 35 U.S.C. 154(b) by 0 days.

(21) Appl. No.: 11/939,491

(22) Filed: Nov. 13, 2007

(65) Prior Publication Data

US 2008/0061546 A1 Mar. 13, 2008

Related U.S. Application Data

(63) Continuation of application No. 11/246,730, filed on Oct. 6, 2005, now Pat. No. 7,293,802, which is a continuation-in-part of application No. 10/979,358, filed on Nov. 2, 2004, now Pat. No. 7,300,073.

(51) Int. Cl.
*B60P 3/22* (2006.01)
*B60P 3/24* (2006.01)

(52) U.S. Cl. .................. 280/839; 280/837; 280/830; 137/185; 137/590

(58) Field of Classification Search .................. None
See application file for complete search history.

(56) References Cited

U.S. PATENT DOCUMENTS

| | | | |
|---|---|---|---|
| 2,022,324 A | 11/1935 | Schock | |
| 2,340,628 A | 2/1944 | Theriault | |
| 2,421,765 A | 6/1947 | Taylor | |
| 2,567,164 A | 9/1951 | Brehany et al. | |
| 3,095,206 A * | 6/1963 | Fresia et al. | 280/838 |
| 3,172,566 A | 3/1965 | Tomlinson et al. | |
| 3,263,865 A * | 8/1966 | Kachnik | 222/159 |
| 3,352,461 A | 11/1967 | Dascanio | |
| 3,604,719 A * | 9/1971 | Kerr | 280/839 |
| 4,213,728 A | 7/1980 | McKenzie | |
| 4,272,089 A | 6/1981 | Watkins, Jr. | |
| 4,394,027 A | 7/1983 | Watkins, Jr. | |
| 4,395,052 A | 7/1983 | Rash | |
| 4,482,017 A | 11/1984 | Morris | |
| 4,502,610 A | 3/1985 | Todd | |
| 5,071,166 A | 12/1991 | Marino | |
| 5,121,796 A | 6/1992 | Wigington, Sr. | |
| 5,232,246 A | 8/1993 | Page | |
| 5,419,400 A | 5/1995 | Wigington, Sr. | |
| 6,715,195 B2 | 4/2004 | Erickson | |

(Continued)

OTHER PUBLICATIONS

PIG® Material Safety Data Sheet, date unknown, 2 pages.

(Continued)

*Primary Examiner*—Lesley D Morris
*Assistant Examiner*—Marlon A Arce
(74) *Attorney, Agent, or Firm*—Dorsey & Whitney LLP (57) ABSTRACT

A trailer has a fluid storage and supply container supported on the bed of the trailer, and a containment wall surrounding the fluid storage and supply container to provide an open containment region. A drain valve controls the flow of fluid collecting in the containment region. A filter separates the fluid from any water draining from the containment region.

19 Claims, 10 Drawing Sheets

U.S. PATENT DOCUMENTS

| | | |
|---|---|---|
| 6,797,168 B1 | 9/2004 | Knight |
| 7,053,823 B2 | 5/2006 | Cervinka et al. |
| 7,070,692 B2 | 7/2006 | Knight |
| 7,293,802 B2 | 11/2007 | Bachman et al. |
| 2006/0091667 A1 | 5/2006 | Bachman |
| 2008/0238077 A1 | 10/2008 | Bachman |

OTHER PUBLICATIONS

PIG® Oil-Only Mat Absorbents, date unknown, 1 page.

* cited by examiner

MOBILE FLUID STORAGE AND SUPPLY APPARATUS AND METHOD

CROSS REFERENCE TO RELATED APPLICATIONS

This application is a continuation of U.S. patent application Ser. No. 11/246,730, entitled "Mobile Fluid Storage and Supply Apparatus", filed on Oct. 6, 2005, now U.S. Pat. No. 7,293,802, which is a continuation-in-part of U.S. patent application Ser. No. 10/979,358, entitled "Fuel Tank Trailer", filed on Nov. 2, 2004, which are hereby incorporated by reference herein in their entireties.

FIELD OF THE INVENTION

The present invention relates generally to the field of tank trailers. More specifically, the present invention discloses a tank trailer with a secondary containment wall.

BACKGROUND

Tank trailers are used to transport fuels and other fluids from one location to another location. Some tank trailers are little more than a tank with wheels and a trailer hitch, which provides no means for secondary containment of a fuel or other fluid leaking or spilling from the tank. One potential approach to this problem is to use a double-walled tank in which an interior wall defines a volume for the tank and an exterior wall surrounds the interior wall. The void between the surfaces of the interior and exterior walls provides a secondary containment region for any fluid leaking through the interior wall. However, double-walled tanks are significantly more expensive to construct than single walled tanks. In addition, it can be difficult to detect leakage through the interior wall, particularly at the initial stages of a leakage problem if only a small amount of fluid is escaping through the interior wall. Some double-walled tanks attempt to address this problem by installing a sight glass or access port into the secondary containment region between the tank walls. Nonetheless, it is advantageous to be able to visually inspect as much of the exterior surface of the interior wall as possible so that leakage problems can be detected as soon as possible.

The prior art in this field includes the following:

| Inventor | Patent No. | Issue Date |
| --- | --- | --- |
| Erickson | 6,715,195 | Apr. 6, 2004 |
| Page | 5,232,246 | Aug. 3, 1993 |
| Marino | 5,071,166 | Dec. 10, 1991 |
| Morris | 4,482,017 | Nov. 13, 1984 |
| Kerr | 3,604,719 | Sep. 14, 1971 |
| Dascanio | 3,352,461 | Nov. 14, 1967 |
| Kachnik | 3,263,865 | Aug. 2, 1966 |
| Brehany et al. | 2,567,164 | Sep. 11, 1951 |
| Taylor | 2,421,765 | Jun. 10, 1947 |

None of the prior art references disclosed above appear to show a tank trailer having a tank surrounded by an open secondary containment region. This approach combines the advantages of a secondary containment system with a convenient of means for visually inspecting the tank for leaks.

BRIEF SUMMARY

One embodiment of the present invention takes the form of a fluid storage and supply container supported on a trailer. The trailer includes a bed and a containment wall. The containment wall and the bed define an open containment region for at least partially containing a fluid leak from the storage and supply container. In some embodiments, the trailer is operatively associated with at least one stanchion that can be used to orient the fluid storage and supply container to a desired orientation relative to the ground. At least one of the at least one stanchion may be lockable to inhibit movement of the trailer from a desired location. A programmable controller may be operatively associated with at least one of the at least one stanchion and programmed to adjust the at least one of the at least one stanchion. At least one of the at least one stanchion may be operatively associated with a grounding member. In some embodiments, the trailer may include a hitch adapted to be selectively detachable from the trailer. In some embodiments, the fluid storage and supply container includes a fluid inlet operatively associated with an inlet cap that can be locked. In some embodiments, the fluid storage and supply container includes a fluid outlet operatively associated with a hose. The operative association between the fluid outlet and the hose may cease upon imposition of an externally applied force on the operative association greater than a predetermined amount. The hose may be operatively associated with a grounding member. In some embodiments, at least one drain valve may be operatively associated with the open fluid containment region. Some embodiments may have a fire extinguisher attached to the trailer. In some embodiments, the fluid and supply container may include internal baffles. Some embodiments may have any or all of the following operatively associated with the trailer: a retractable cable ground, a padlock storage rack, changeable placards, a global positioning system, and a canopy. In some embodiments, a filter may be operatively associated with a pump and with the open containment region. In some embodiments, a level bubble may be operatively associated with the fluid storage and supply container.

Another embodiment of the present invention takes the form of a method of providing fluid to motorized machines at a desired location. The method comprises transporting a mobile fluid storage and supplier container to a predetermined location at a site, orienting the mobile fluid storage and supplier container with at least one stanchion operatively associated with the mobile fluid storage and supply container, locking at least one of the at least one stanchion to inhibit movement of the mobile fluid storage and supply container from the predetermined location, and supplying a motorized machine at a location proximate the predetermined location with a fluid stored in the mobile fluid storage and supply container by transferring the fluid through a conduit operatively associated with a fluid outlet of the mobile fluid storage and supply container and a fluid inlet of the motorized machine. In some embodiments, the method further comprises filling the mobile fluid storage and supply container with the fluid prior to transporting the mobile fluid storage and supply container to the predetermined location at the job site. In some embodiments, the method further comprises filling the mobile fluid storage and supply container with the fluid without moving the mobile fluid storage and supply container from the predetermined site. In some embodiments, the method further comprises removing a hitch operatively associated with the mobile fluid storage and supply container to further inhibit movement of the mobile fluid storage and supply container from the predetermined location. In some embodiments, the method further comprises unlocking the locked stanchions, moving the mobile fluid storage and supply container to a second predetermined location at the site, orienteering the mobile fluid storage and supply container to a desired orientation relative to the ground with at least one stanchion operatively associated with the mobile fluid storage and supply container, locking at least one stanchion to inhibit movement of the mobile fluid storage and supply container from the second predetermined location, and supplying a motorized machine at a location proximate the second predetermined location with the fluid stored in the mobile fluid storage and supply container by transferring the fluid through a conduit operatively associated with the fluid outlet of the mobile fluid storage and supply container and a fluid inlet of the motorized machine.

Another embodiment of the present invention takes the form of a method of providing fluid to motorized machines at a desired location. The method comprises transporting to a predetermined location at a site a trailer including a bed, a hitch, and a containment wall and supporting a mobile fluid storage and supply container wherein the containment wall surrounds the fluid storage and supply container and connects with the bed to define an open fluid containment region around the fluid storage and supply container for at least partially containing a fluid leak from the fluid storage and supply container; detaching the hitch from the trailer to inhibit movement of the trailer from the predetermined location; and supplying a motorized machine at a location proximate the predetermined location with a fluid stored in the mobile fluid storage and supply container by transferring the fluid through a conduit operatively associated with a fluid outlet of the mobile fluid storage and supply container and a fluid inlet of the motorized machine.

Another embodiment of the present invention takes the form of a fluid storage and supply container supported on a trailer. The trailer is operatively associated with at least one stanchion that can be used to orient the fluid storage and supply container to a desired orientation relative to the ground and at least one of the at least one stanchion can be locked to inhibit movement of the trailer from a desired location.

A more complete appreciation of the present invention and its scope can be obtained from the accompanying drawings, which are briefly summarized below, the following detailed description of various embodiments of the invention, and the appended claims.

BRIEF DESCRIPTION OF THE DRAWINGS

The present invention can be more readily understood in conjunction with the accompanying drawings, in which.

DETAILED DESCRIPTION

Figure 1:
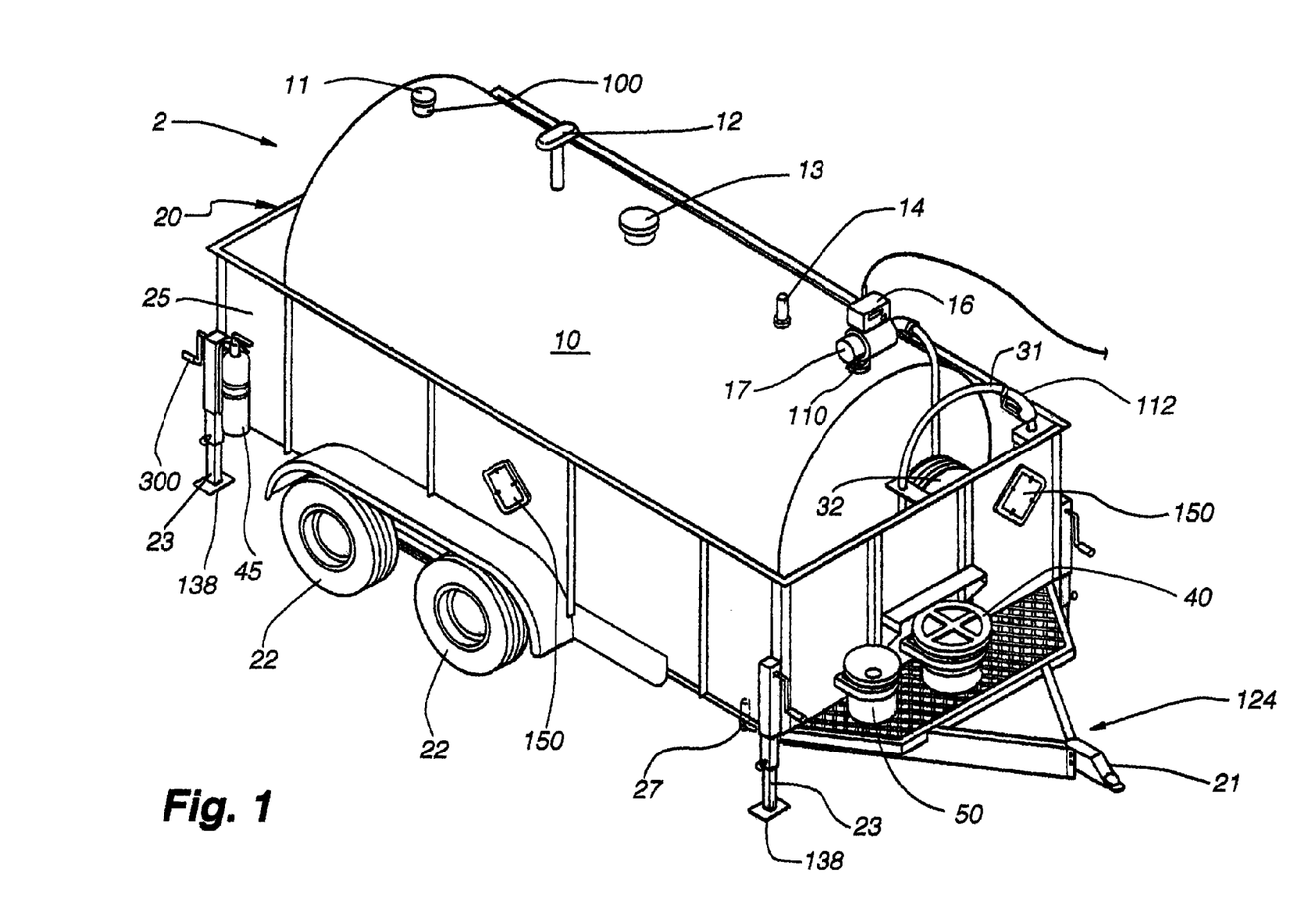
FIG. 1 is a front perspective view of a mobile fluid storage and supply apparatus.
Figure 2:
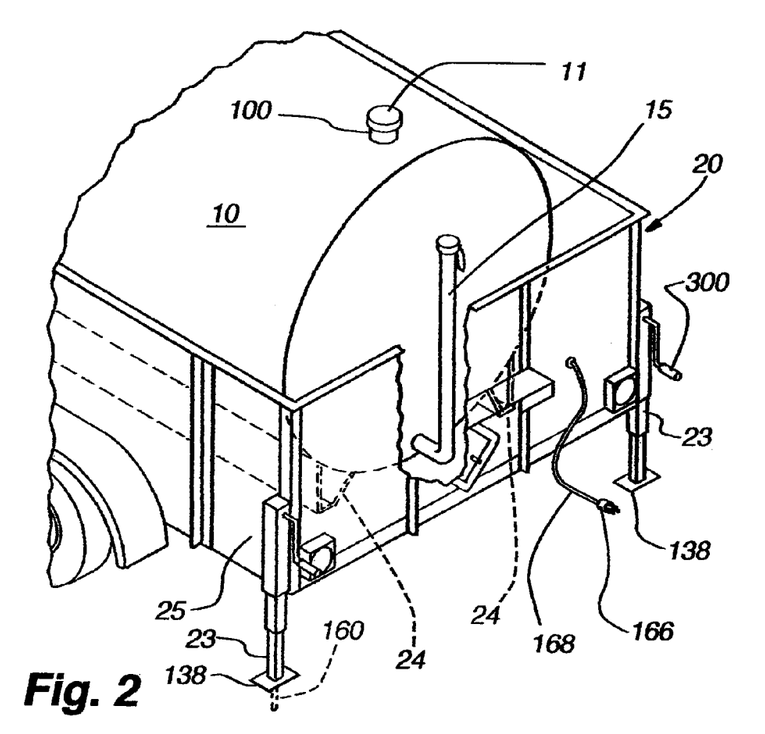
FIG. 2 is a rear perspective view of a portion of the mobile fluid storage and supply apparatus.

Turning to FIG. 1, a front perspective view is provided showing an embodiment of the present invention. A mobile fluid storage and supply apparatus 2 includes a fluid storage and supply container 10 supported on a trailer 20. The fluid storage and supply container 10 may be used to store and supply a wide-range of fluids including fuel, oil, and water. As depicted in FIG. 2, one or more tank supports 24 can be used to cradle and support the fluid storage and supply container 10 on a bed of the trailer 20. This may be especially necessary if the fluid storage and supply container 10 has a rounded or curved vertical cross-section.

Figure 5:
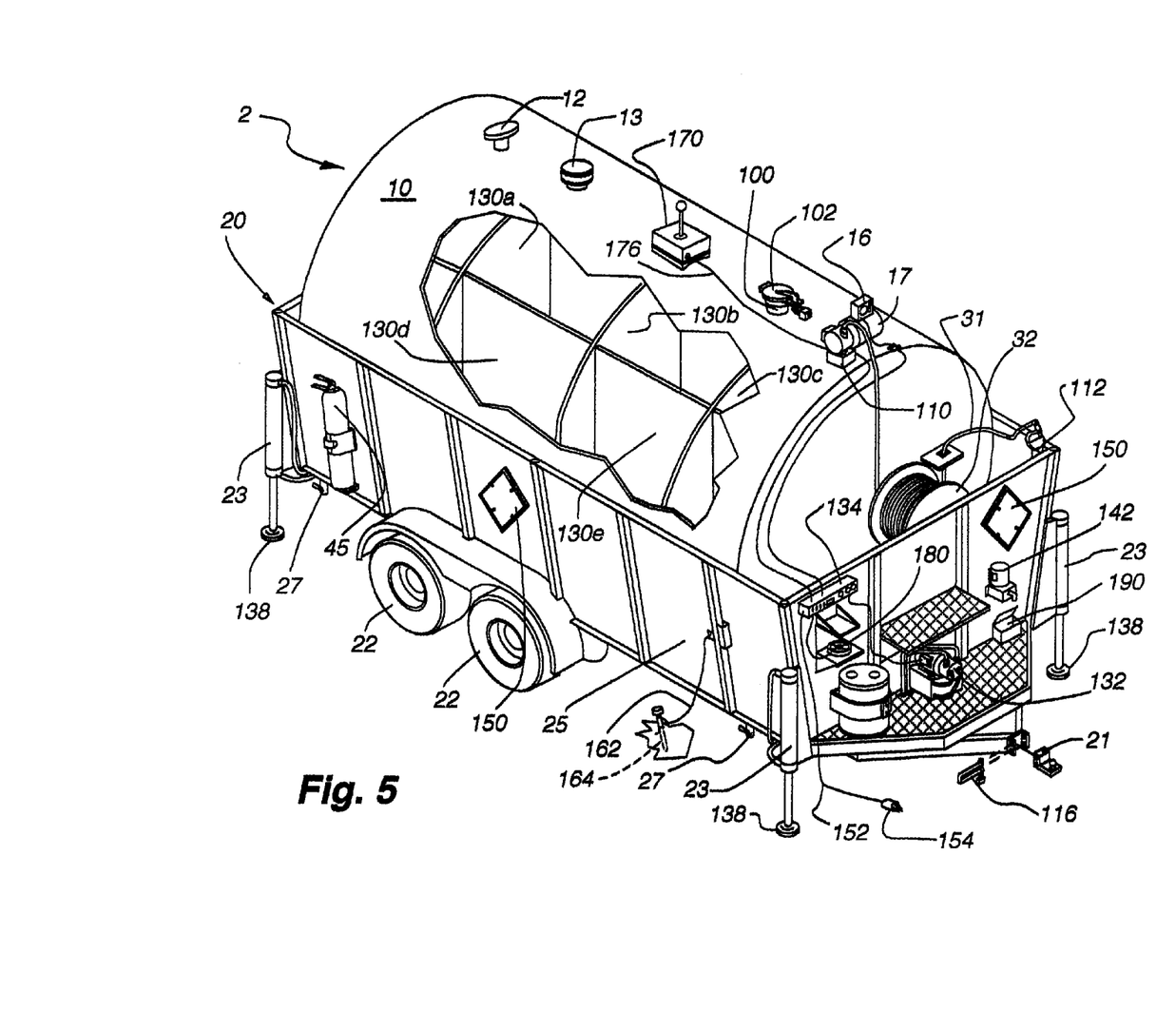
FIG. 5 is a front perspective view of the mobile fluid storage and supply apparatus.

The fluid storage and supply container 10 can be of virtually any conventional construction used for containers that store fluids. For example, the fluid storage and supply container 10 can be either a single-walled or double-walled tank. Further, as shown in FIG. 5, the interior of the fluid storage and supply container 10 may include one or more baffles 130a-e. In the embodiment depicted in FIG. 5, baffles 130a-e have a generally vertical orientation. Other embodiments may have horizontal baffles, baffles in another orientation, or some combination of horizontal baffles, vertical baffles, and baffles in another orientation.

Figure 6:
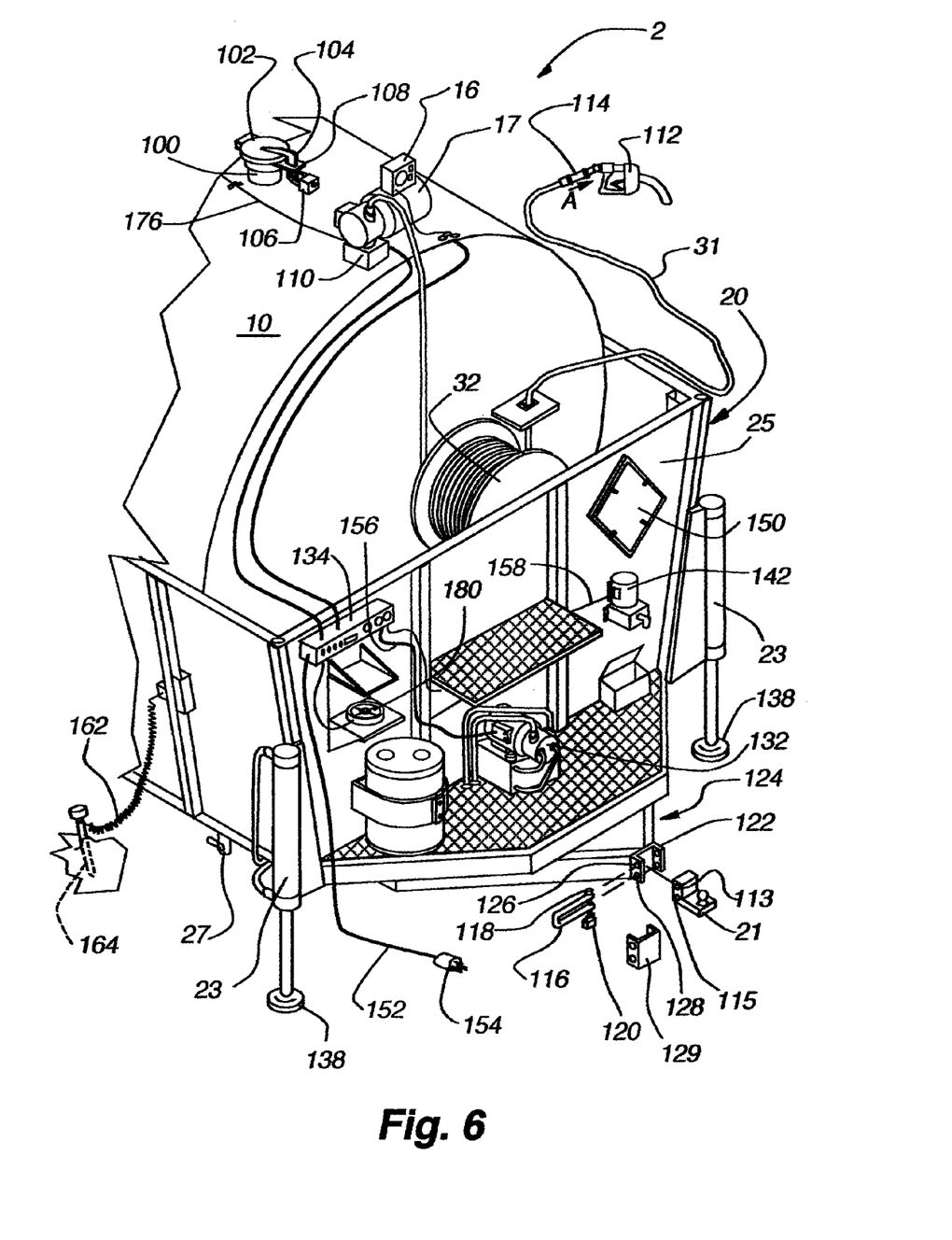
FIG. 6 is a front perspective view of a portion of the mobile fluid storage and supply apparatus.

The fluid storage and supply container 10 may include a fluid inlet 100 operatively associated with an inlet cap 11 for filling the fluid storage and supply container 10, as well as an atmospheric vent 12 and emergency vent 13. As shown in FIGS. 5 and 6, the fluid inlet 100 may be operatively associated with a lockable inlet cap 102 to inhibit access to the fluid inlet 100. In the embodiment depicted in FIG. 6, the lockable inlet cap 102 includes a L shaped member 104 having an aperture adapted to receive a padlock 106. The fluid inlet 100 includes a locking portion 108 extending from the fluid inlet 100 and adapted to receive the portion of the L shaped member 104 containing the aperture when the lockable inlet cap 102 is in a closed position. When the lockable inlet cap 102 is in a closed position, the portion of the L shaped member 104 containing the aperture adapted to receive the padlock 106 passes through the aperture in the locking portion 108 of the fluid inlet 100. A U-shaped portion of the padlock 106 may be inserted into the aperture of the L shaped member 104 and operatively engaged with the locking mechanism of the padlock 106 to lock the lockable inlet cap 102. Although the lockable inlet cap 102 is depicted in FIGS. 5 and 6 as being locked with a padlock, other means of locking the lockable inlet cap 102 to inhibit access to the fluid inlet 100 may be utilized. For example, a key or combination operated locking mechanism contained within the lockable inlet cap 102 and operatively associated with the fluid inlet 100 may be used to lock the lockable inlet cap 102.

Turning back to FIG. 1, a fill level sight gauge 14 provides an externally visible indication of the fluid level in the fluid storage and supply container 10. The interior of the fluid storage and supply container 10 can also be accessed through an empty port 15, shown in FIG. 2, to remove fluid from the fluid storage and supply container 10 in preparation for cleaning and maintenance. Fluid can be withdrawn from the fluid storage and supply container 10 utilizing a pump 17 operatively associated with a fluid outlet 110 of the fluid storage and supply container 10, gravity, or other methods of causing fluid to flow out of the fluid storage and supply container 10. Optionally, the amount of fluid withdrawn from the fluid storage and supply container 10 can be measured by a meter 16 operatively associated with the fluid outlet 110. Fluid can be delivered via a hose 31 operatively associated with the fluid outlet 110 and a nozzle 112. The hose 31 can stored in a hose reel 32 mounted to the trailer 20 when not in use. The hose 31 may be operatively associated with a grounding member such as a ground wire. The grounding member may be contained within the hose 31 or may be external to the hose 31.

As depicted in FIG. 6, a safety break-way member 114 may be operatively associated with the hose 31 and the nozzle 112. Upon an exceedance of a predetermined amount of externally imposed force on the safety break-away member 114 in the general direction shown by the arrow A in FIG. 6, the operative association between the nozzle 112 and the safety break-away member 114 will cease thereby causing the operative association between the nozzle 112 and the hose 31 to cease.

There could be many sources for the externally imposed force. For example, a motorized vehicle (not shown) could be the source of the externally imposed force. Specifically, the nozzle 112 could be inserted into a fluid inlet of the motorized vehicle. If the motorized vehicle moved away from the location of the fluid storage and supply container 10 without the nozzle 112 being disengaged from the fluid inlet of the motorized vehicle, the motorized vehicle could begin exerting a force on the safety break-away member 114. Once this externally applied force reached the predetermined amount, the operative association between the nozzle 112 and the safety break-way member 114 would cease. In general, the predetermined amount will be selected to be within a range that is approximately greater than a de minimis amount (e.g., the force that may be imposed by a person pulling on the nozzle 112) and approximately less than the force that would cause the hose 31 to cease to be operatively associated with the fluid outlet 110.

Turning back for FIG. 1, the trailer 20 is mounted on wheels 22 and can be towed by means of a hitch 21. The hitch 21 may be selectively detachable from the trailer 20. Referring to FIG. 6, an embodiment of a hitch 21 that can be selectively detached from the trailer 20 is depicted. The hitch 21 includes two apertures 113 and 115 adapted to receive U-bolt 116. U-bolt 116 includes two aligned apertures adapted to receive a pin 118. Pin 118 has a head at one end that encompasses the apertures in U-bolt 116 and a threaded end at its other end adapted to receive nut 120. To operatively associate hitch 21 with trailer 20, hitch 21 is inserted into a hitch receiving portion 122 of hitch support 124 so that apertures 113 and 115 align with apertures 126 and 128 located in hitch receiving portion 122. U-bolt 116 is inserted through aligned apertures 113, 115, 126, and 128. Pin 118 is inserted through the apertures in U-bolt 116, and nut 120 is threaded onto pin 118 to lock U-bolt 116 in place. To detach hitch 21 from trailer 20, nut 120 is removed from pin 118. Pin 118 is removed from U-bolt 116, and U-bolt 116 is removed from apertures 113, 115, 126, and 128. Hitch 21 is then removed from hitch receiving portion 122. Other methods of enabling hitch 21 to be selectively detached from the trailer 20 are possible. For example, U-bolt 116 could be replaced with two threaded bolts or trailer hitch support 124 could be detachable from trailer 20. Further, both hitch 21 and the hitch support 124 could be detachable from the hitch support 124 and the trailer 20 respectively.

To inhibit an unauthorized party from operatively associating a hitch 21 with trailer 20 via hitch support 124, it may be desirable to inhibit the party's ability to utilize hitch receiving portion 122. Various means of inhibiting the utilization of hitch receiving portion 122 may be employed. For example, U-shaped portions of one or more padlocks could be inserted into apertures 126 and 128 of hitch receiving portion 122 and engaged with the locking mechanisms of the padlocks thereby preventing insertion of fasteners such as U-bolt 116 into apertures 126 and 128. As another example, a U-shaped plate 129 adapted to be received by hitch receiving portion 122 and including apertures adapted to align with apertures 126 and 128 of hitch receiving portion 122 could be inserted into the hitch receiving portion 122. The U-shaped plate 129 could be locked into place utilizing various means. For example, the U-shaped plate 129 could be locked into place by inserting U-shaped portions of one or more padlocks through the aligned apertures and engaging the U-shaped portions with the locking mechanisms of the padlocks. As another example, the U-shaped plate 129 could be locked into place by inserting U-bolt 116 through the aligned apertures of the hitch receiving portion 122 and the U-shaped plate 129; inserting through the apertures in the U-bolt 116 a pin including at one end a head that encompasses the U-bolt's 116 apertures and at an opposite end an aperture adapted to receive a portion of a locking device (e.g., the U-shaped portion of a padlock); inserting through the aperture in the pin the portion of the locking device; and engaging the inserted portion of the locking device with a locking mechanism of the locking device.

Figure 9:
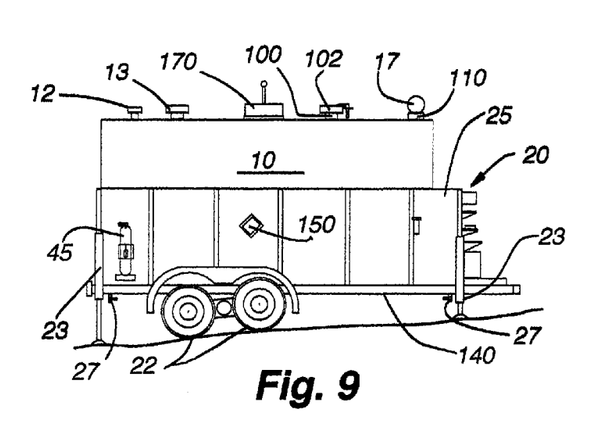
FIG. 9 is a simplified elevation view of the mobile fluid storage and supply apparatus showing an orientation of the fluid storage and supply container relative to the ground.
Figure 10:
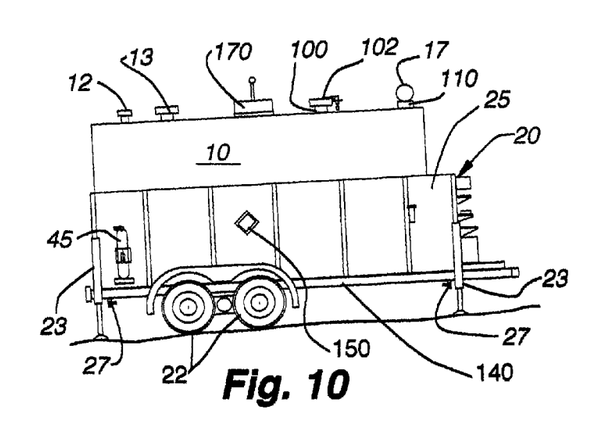
FIG. 10 is a simplified elevation view of the mobile fluid storage and supply apparatus showing another orientation of the fluid storage and supply container relative to the ground.

Turning back to FIG. 1, a number of stanchions 23 may be operatively associated with the trailer 20 to orient the fluid storage and supply container 10 to a desired orientation relative to the ground when the trailer 20 is stationary. For example, the stanchions 23 can be adjusted so that the fluid storage and supply container 10 is substantially level as depicted in FIG. 9. As shown in FIG. 5, a leveling bubble 180 may be operatively associated with the fluid storage and supply container 10 to indicate when the fluid storage and supply container 10 is substantially level. It may be desirable, however, for the fluid storage and supply container 10 to be oriented at other orientations relative to the ground. For example, it may be desirable, as depicted in FIG. 10, for the fluid storage and supply container 10 to be oriented such that the bed 140 of the trailer 20 slopes towards a drain valve 27.

Many possible methods for adjusting the stanchions 23 may be utilized. For example, the stanchions 23 may be adjusted using a crank mechanism as depicted in FIG. 1. The stanchions 23 may be adjusted by a pneumatic pump 132 operatively associated with the stanchions 23 as depicted in FIG. 6. The pneumatic pump 132 may be operatively associated with a controller 134. The controller 134 may be operatively associated with a generator (not shown) or other power source such as an electrical outlet. In the embodiment shown in FIG. 6, the controller 134 is operatively associated with the generator or other power source via a power cord 152 attached to a power plug 154. Power to operate the pneumatic pump 132 may be supplied via a power line 156 running between the pneumatic pump 132 and the controller 134 as shown in FIG. 6 or could be supplied to the pneumatic pump 132 by directly associating the pneumatic pump 132 with another source of power such as generator, an electrical outlet, or an electrical motor. In addition to using the pneumatic means described above to adjust the stanchions 23, the stanchions 23 could be adjusted using hydraulics, manually operated mechanisms, electric motors, etc.

The controller 134 can be operatively associated with one or more of the stanchions 23 and programmed to adjust one or more of the stanchions 23 to orient the fluid and supply container 10 to the desired orientation. As depicted in FIG. 6, the controller 134 is operatively associated with the stanchions 23 via the controller's 134 ability to control the power supplied to the pneumatic pump 132. Other means of operatively associating the controller 134 with the stanchions 23 could be utilized. For example, the controller 134 could be operatively associated with a motor that would operate the crank mechanism depicted in FIG. 1.

One or more of the stanchions 23 can be locked to inhibit movement of the trailer 20. As used herein with respect to the stanchions 23, the term "lock" or "locked" means inhibiting the ability of an unauthorized party to adjust one or more of the stanchions 23. There are many possible methods for locking one or more of the stanchions 23. The following descriptions of methods for locking one or more the stanchions 23 are merely illustrative of some of the possible methods for locking the stanchions 23 and are not intended to limit the scope of the invention. Other methods of locking the stanchions 23 not described could be practiced without departing from the scope of this invention as set forth in the claims. Further, more than one method for locking one or more of the stanchions 23 could be practiced concurrently.

Figure 7:
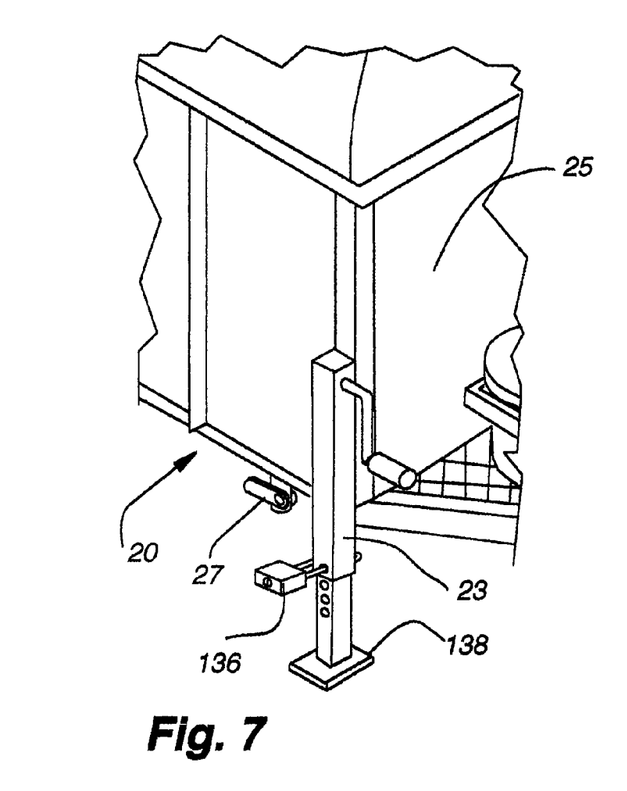
FIG. 7 is a front perspective view of a portion of the mobile fluid storage and supply apparatus.

Depicted in FIG. 7 is an embodiment of a method to lock a stanchion 23. Specifically, a padlock 136 is utilized to lock stanchion 23. When stanchion 23 is engaged with the ground, as shown in FIG. 2, and locked with padlock 136, as shown in FIG. 7, padlock 136 substantially prevents stanchion 23 from being disengaged from the ground thereby inhibiting movement of trailer 20.

One or more of the stanchions 23 may be locked by operatively associating a stanchion 23 with a substantially immovable object to substantially prevent movement of the stanchion 23 from its current location. For example, referring to FIG. 2, a stanchion base plate 138 could include apertures (not shown) adapted to receive anchor spikes (not shown). When stanchion 23 is engaged with the ground, the anchor spikes could be driven into the ground through the apertures in the stanchion base plate 138 thereby substantially preventing the stanchion 23 from being moved which in turn would inhibit movement of the trailer 20.

One or more of the stanchions 23 may be locked by denying access to the controls or mechanisms for adjusting the stanchions 23. One method for denying access to the controls or mechanisms for adjusting the stanchions 23 is to deny access to the controller 134 when the controller 134 is used to control the adjustment of the stanchions 23 as described above. Access to the controller 134 could be denied by placing the controller 134 in a lockable cabinet (not shown) or other lockable area and locking the cabinet or other lockable area when the controller 134 is not being used or by requiring passwords, codes, keys or other security devices operatively associated with the controller 134 to be utilized to gain access to the functionality of the controller 134.

Another method for denying access to the controls or mechanisms for adjusting the stanchions 23 is to remove or disable certain components of the controls or mechanisms used to adjust the stanchions 23. For example, for the hand-operated crank mechanism depicted in FIGS. 1 and 2, a hand crank 300 operatively associated with stanchion 23 and adapted for engaging the mechanism for adjusting stanchion 23 could be selectively detachable from stanchion 23. The hand crank 300, when not being used, could be detached from the stanchion 23 and stored in a locked storage container or other inaccessible location. Alternatively, the hand crank 300 could be disabled by operatively associating the hand crank 300 with a device that would substantially prevent the hand crank 300 from being operated. For example, a chain could be operatively associated with an essentially immovable object (e.g., a containment wall 25 of the trailer 20) and adapted to substantially prevent rotation of the hand crank 300 when selectively operatively associated with the hand crank 300.

As shown in FIG. 2, a stanchion 23 may be operatively associated with a grounding member 160 for providing an electric ground for the mobile fluid storage and supply apparatus 2. The grounding member 160 may be a grounding spike. As shown in FIGS. 5 and 6, the mobile fluid storage and supply apparatus 2 may also be grounded using a retractable cable 162 operatively associated with the trailer 20 and a grounding member 164. Grounding member 164 may be driven into the ground to provide additional electric ground for mobile fluid storage and supply apparatus 2.

Figure 11:
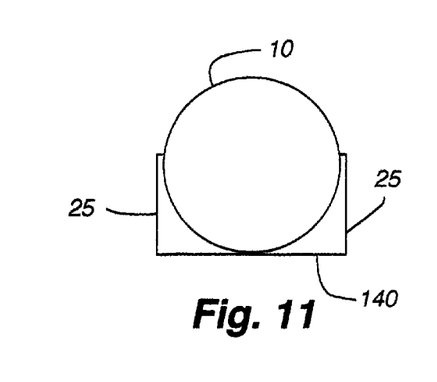
FIG. 11 is a simplified cross-sectional view of the mobile fluid storage and supply apparatus showing a cross-section of the open containment region defined by a containment wall and a bed.
Figure 12:
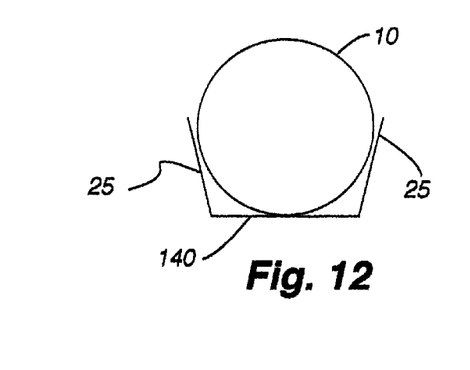
FIG. 12 is a simplified cross-sectional view of the mobile fluid storage and supply apparatus showing another cross section of the open containment region defined by a containment wall and a bed.

Turning back to FIG. 1, a containment wall 25 surrounds the fluid storage and supply container 10. The containment wall 25 may extend substantially perpendicularly from the bed 140 of the trailer 20 as generally shown in FIG. 11 or may extend at an inclined angle from the bed 140 of the trailer 20 as shown generally in FIG. 12. The containment wall 25 may be substantially straight, substantially curved, a combination of straight and curved, or any other configuration. An enclosed area defined by the bed 140 and the containment wall 25 provides a fluid containment region surrounding the fluid storage and supply container 10 for at least partially containing a fluid leak from the fluid storage and supply container 10. The fluid containment region is open for visual inspection to determine whether fluid is leaking from the fluid storage and supply container 10. For example, the containment wall 25 can extend around the perimeter of the bed of the trailer 20 as illustrated in FIGS. 1 and 2. In some embodiments, the height of the containment wall 25 is great enough so that the fluid containment region can contain the entire contents of the fluid storage and supply container 10 but is sufficiently low to allow convenient access to the fluid storage and supply container 10 and permit visual inspection of the fluid containment region and the fluid storage and supply container 10. In some embodiments, the fluid containment region has a volume sufficient to contain at least one-hundred ten percent (110%) of the volume of fluid that can be stored in the fluid storage and supply container 10. The volume of the fluid containment region, however, could be greater or less than one-hundred ten percent of the volume of fluid that can be stored in the fluid storage and supply container 10. The exposed surfaces of the fluid containment region (i.e., the trailer bed and interior surfaces of the containment wall 25) can be treated with a polymeric coating or other such treatment to reduce rust and corrosion.

Figure 3:
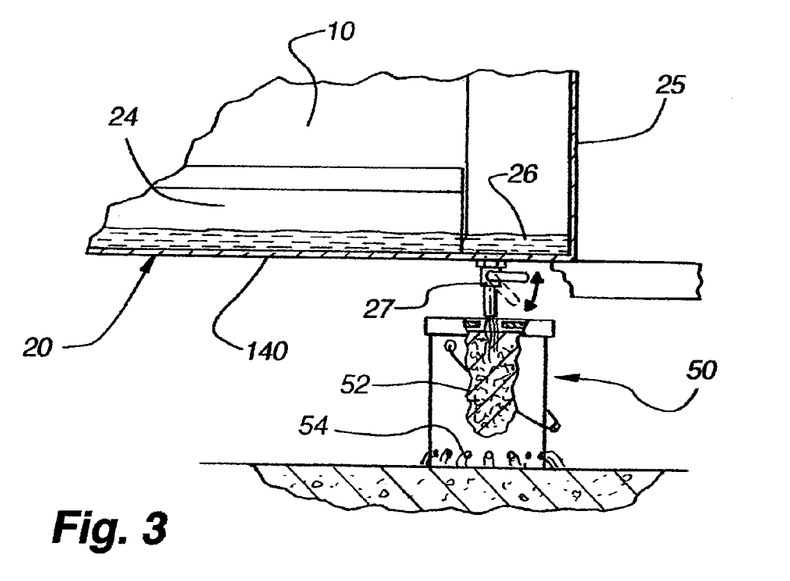
FIG. 3 is a detailed vertical cross-sectional view of a portion of a trailer adjacent to a drain valve including a filter.

As shown in FIG. 5, one or more drain valves 27 may be operatively associated with the trailer 20. As shown in FIG. 3, a drain valve 27 controls drainage of fluid 26 collected in the fluid containment region. If the fluid 26 is water, which may have been collected as a result of a water leak from a fluid storage and supply container 10 that contains water or as a result of water entering the open fluid containment region from an external source such as rain or snow, this can be allowed to drain onto the ground without treatment simply by opening the drain valve 27. On the other hand, if visual inspection reveals that a fluid such as a fuel or other hazardous or environmentally harmful fluid has leaked from the fluid storage and supply container 10 and collected in the fluid containment region, a filter 50 can be placed beneath the drain valve 27, as illustrated in FIG. 3, to separate any water (e.g., water from rain or snow) mixed in with the fluid 26 draining through the drain valve 27. The filter 50 may also be used to filter particulates from the fluid 26.

In the embodiment shown in FIG. 3, the filter 50 is a bucket containing a filter material 52 that selectively absorbs one or more fluids such as oil, gasoline, and other hydrocarbon-based fluids while not absorbing water. For example, "Oil-Only PIG" absorbent material marketed by New Pig Corporation of Tipton, Pa., can be used as the filter material 52. This material contains a cellulose pulp core with an outer layer of polypropylene. Holes 54 in the bottom of the filter 50 allow water to escape. Thus, any water mixed in with the fluid 26 draining into the filter 50 percolates through the filter material 52 and flows out through the holes 54. In contrast, any hazardous or other environmentally harmful fluid such as a gasoline or other hydrocarbon based fluid will be absorbed by the filter material 52. After filtering has been completed, the filter material 52 and any trapped or absorbed fluid can be removed for incineration, disposal, or further treatment.

To aid in draining fluid 26 from the fluid containment region, the stanchions 23 may be adjusted so that the bed 140 of the trailer 20 slopes towards one of the drain valves 27. In some embodiments, the bed 140 of the trailer can be sloped towards the drain valves 27 so that the fluid 26 in the fluid containment region will more readily flow towards the drain valves 27 when the fluid storage and supply container 10 is substantially level as depicted in FIG. 9.

Figure 8:
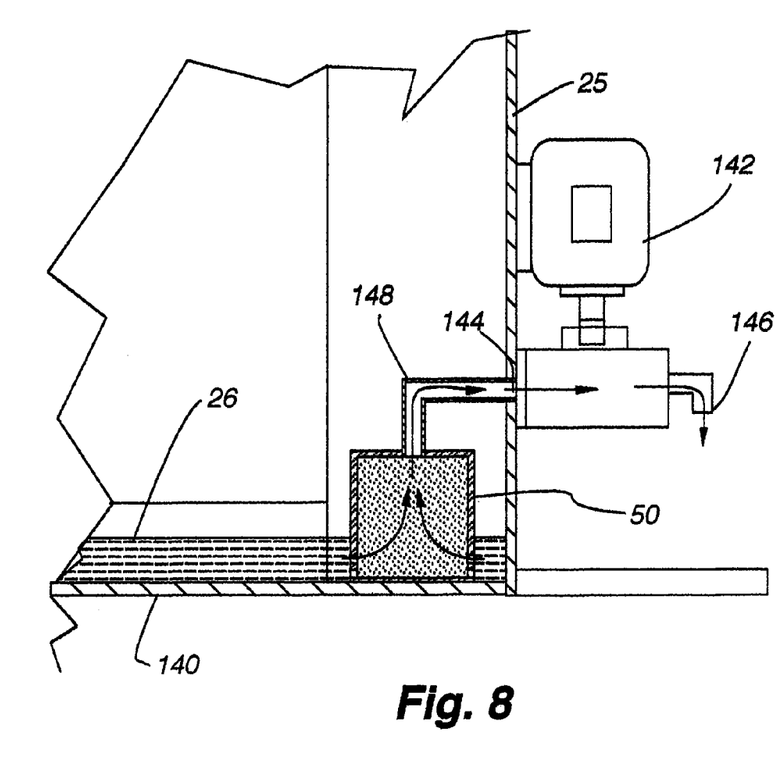
FIG. 8 is a cross-sectional view of a portion of the mobile fluid supply and storage apparatus.

As shown in FIG. 8, the filter 50 may be placed within the fluid containment region and operatively associated with a pump 142 having a fluid inlet 144 and a fluid outlet 146. In the embodiment depicted in FIG. 8, the filter 50 is supported on the bed 140 of the trailer 20 and is operatively associated with the fluid inlet 144 of the pump 142 by a flexible hose 148. The flexible hose 148 may be of sufficient length to permit the filter 50 to be located anywhere within the fluid containment region. In the embodiment shown in FIG. 8, fluid 26 generally flows thorough the filter 50 and out of the fluid outlet 146 of the pump 142 in the direction depicted by the arrows. For further filtering, a second filter (not shown) such as the one shown in FIG. 3 could be located beneath the fluid outlet 146 of the pump 142. Power to operate the pump 142 may be supplied via a power line 158 running between the pump 142 and controller 134 as shown in FIG. 6 or could be supplied to the pump 142 by directly associating the pump 142 with a generator or other source of power such as an electrical outlet.

Figure 4:
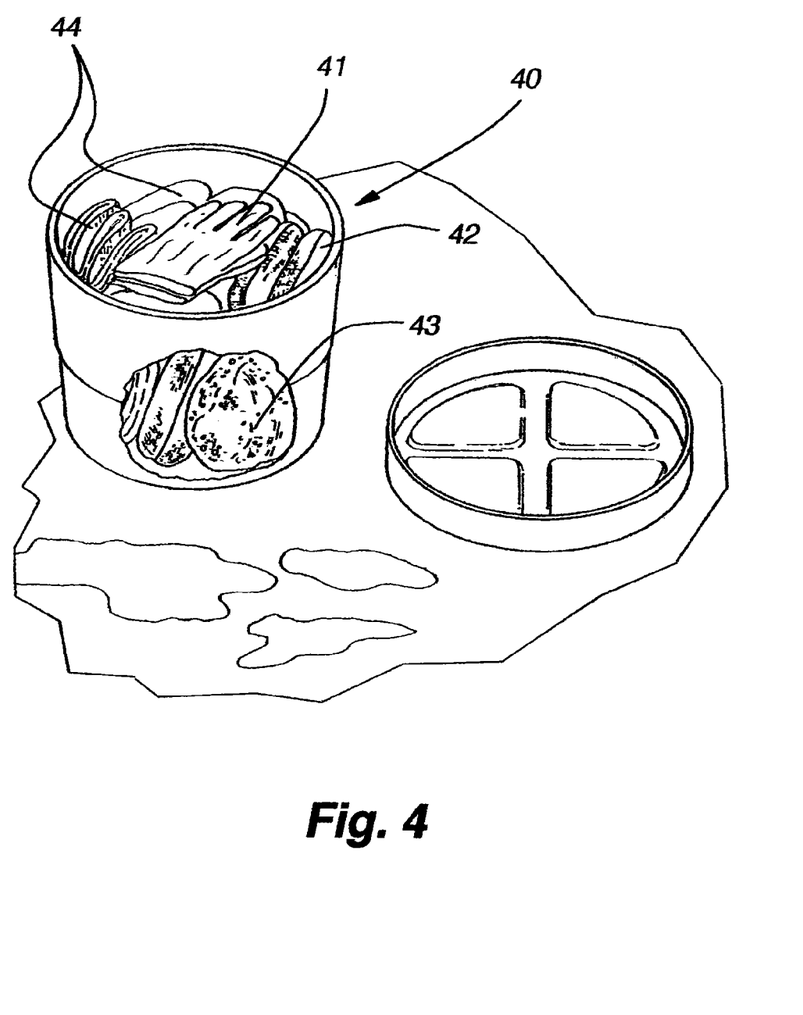
FIG. 4 is a perspective view of a spill clean-up kit.

Referring to FIG. 1, the mobile fluid storage and supply apparatus 2 can also be equipped with a spill clean-up kit 40 to remove fuel spills. An example of a spill clean-up kit 40 is shown in FIG. 4. This kit 40 includes rubber gloves 41, absorbent pads 42, clay 43, and other absorbent materials 44. Referring back to FIG. 1, a fire extinguisher 45 can be attached to the trailer 20.

One or more changeable placards 150 can operatively associated with the trailer 20. Each changeable placard 150 may contain various warnings or other information. For example, a changeable placard 150 may provide information on the type of fluid contained with the fluid storage or supply container 10, a "no smoking" warning, or information required by regulatory authorities. The changeable placard 150 may be provided in book format with various information printed on the various pages of the changeable placard 150. In some embodiments, the changeable placards 150 are operatively associated with the trailer 20 using frames operatively associated with the trailer 20 and adapted to receive the changeable placards 150. These frames provide a ready means for swapping one changeable placard 150 with another changeable placard 150 or for removing the changeable placard 150 to change the displayed pages of the changeable placard 150. In some embodiments, the changeable placards 150 may have one or more magnetic sides to allow the changeable placards 150 to be magnetically attached to any metallic surface of the trailer 20 and to permit the changeable placards 150 to be readily detached from the trailer 20.

With reference to FIG. 2, a power plug 166 may be operatively associated with the trailer 20. In the embodiment depicted in FIG. 2, the power plug 166 is operatively associated with the trailer 20 via a power cord 168. With reference to FIG. 5, a padlock storage container 190 may be operatively associated with the trailer 20 to store padlocks 106 and 136 when they are not being used.

With reference to FIG. 5, a global location system 170 may be operatively associated with the trailer 20. The global location system 170 can be configured to permit the position of the trailer 20 to be tracked from a remote location. In general, the global location system 170 should be operatively associated with the trailer 20 such that the component or components of the global location system 170 (e.g., a GPS antenna of a GPS receiver) that receive information from global position system ("GPS") satellites are in the line of sight of the minimum number of satellites (typically at least three) required to establish the global position of the trailer 20.

Figure 15:
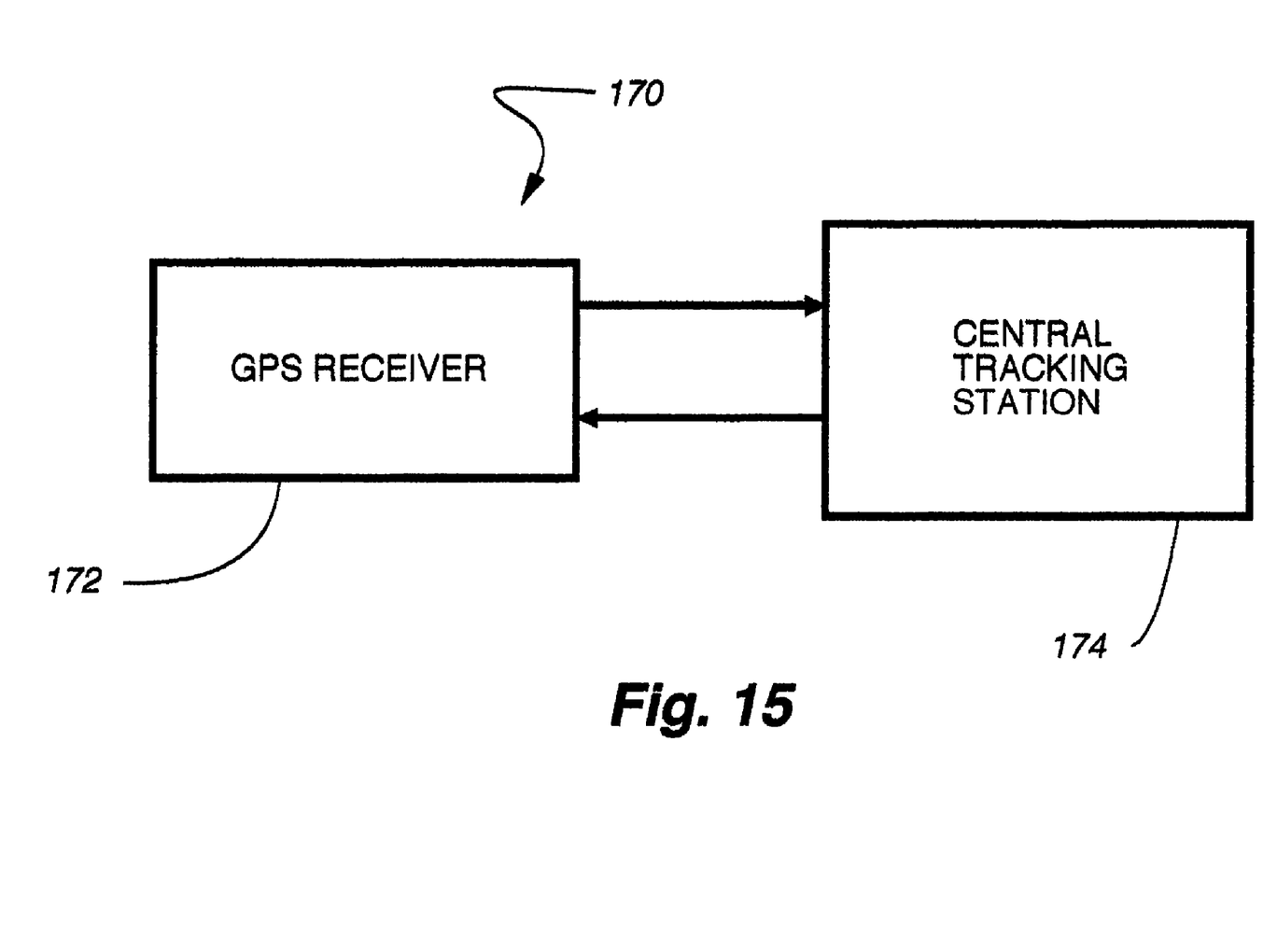
FIG. 15 is a block diagram of a global location system.

Referring to FIG. 15, the global location system 170 includes a global position system (GPS) receiver 172 configured to communicate with a central tracking station 174. The GPS receiver 172 may communicate with the central tracking station 174 via radio frequency, cellular transmission, or other wireless transmission; via optic fiber line, telephone line, or other wired connection; or via a combination of wired connections and wireless transmissions or signals. The communications between the GPS receiver 172 and the central tracking station 174 may be direct or may pass through one or more intermediate communication stations. The GPS receiver 172 may periodically or continuously transmit and receive communications to and from the central tracking station 174, and the central tracking station 174 may periodically or continuously transmit and receive communications to and from the GPS receiver 172. The central tracking station 174 can be configured to alert a user if a position of the trailer 20 indicated by the global location system 170 differs from an expected location of the trailer 20. The global location system 170 can be configured to sound an audio alarm or provide another type of alert proximate the trailer 20 if a position of the trailer 20 indicated by the global location system 170 differs from the expected location of the trailer 20. The global location system 170 can also be used to verify that the trailer 20 has been moved to the right location at a site. Power to the global location system 170 may be supplied via a power line 176 running between the global location system 170 and controller 134 as shown in FIG. 6 or could be supplied to the global location system 170 by directly associating the global location system 170 with a generator or other source of power such as a battery, solar cell, or electrical outlet.

Figure 13:
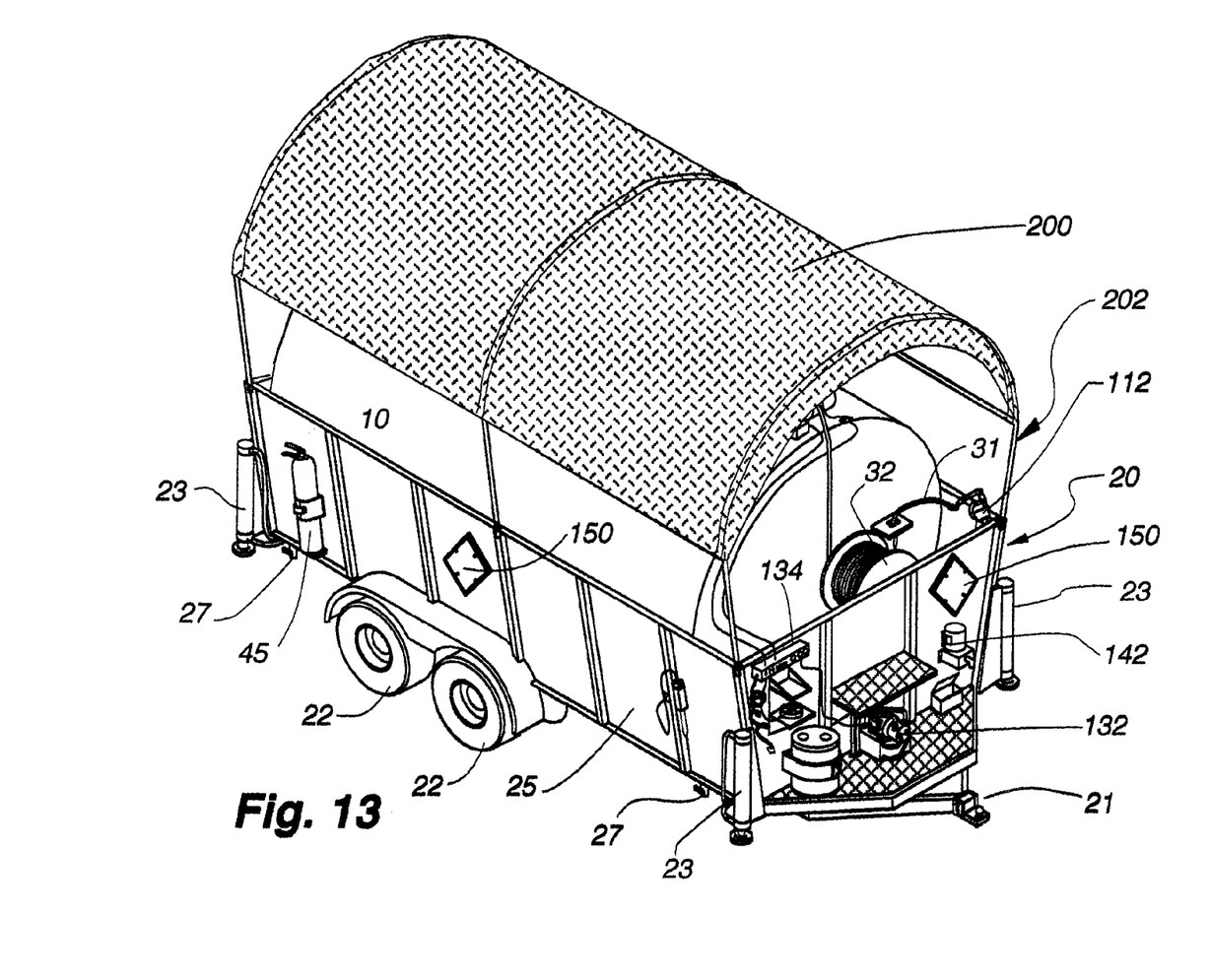
FIG. 13 is a front perspective view of the mobile fluid storage and supply apparatus showing a canopy operatively associated with a trailer.
Figure 14:
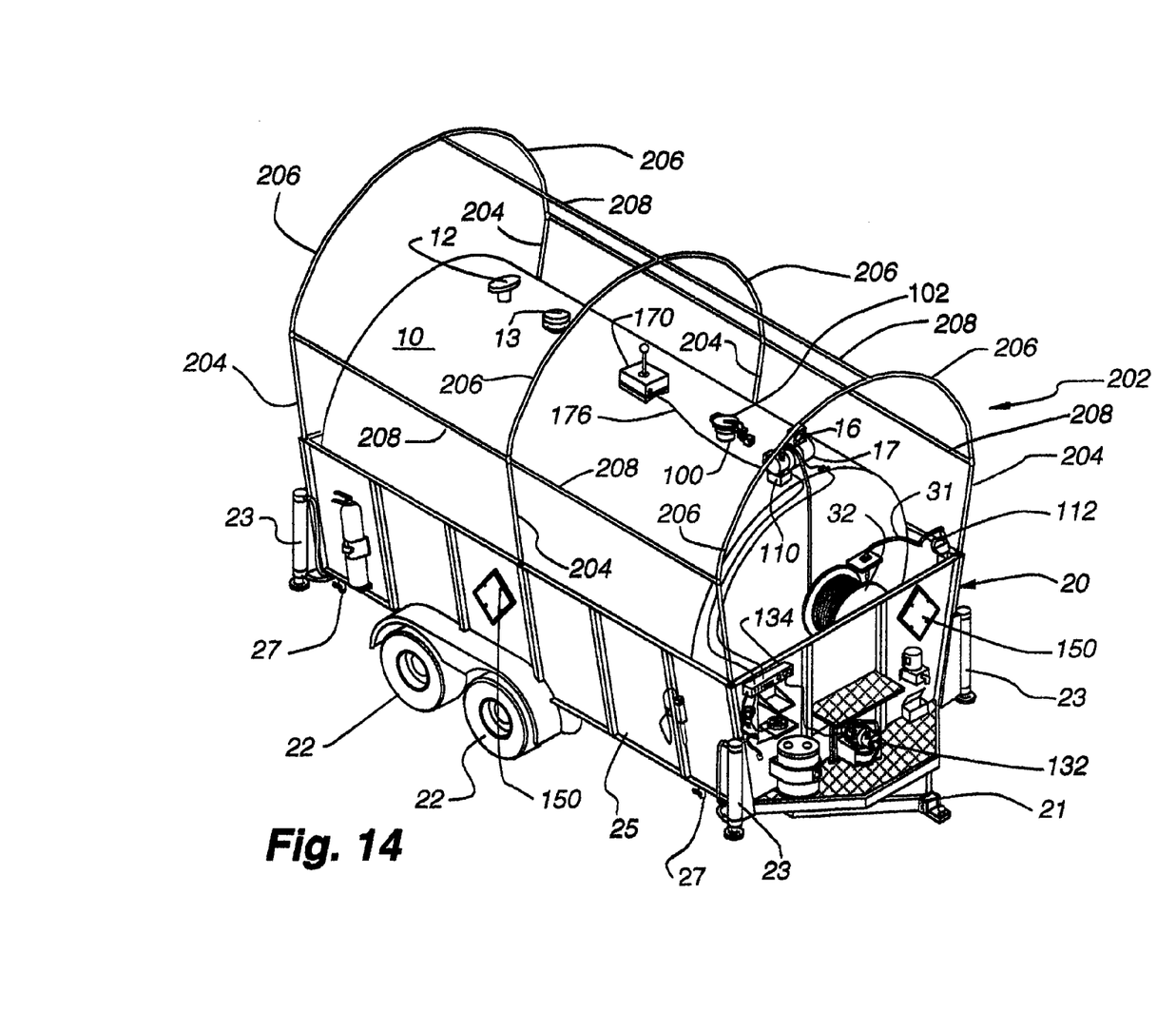
FIG. 14 is a front perspective view of the mobile fluid storage and supply apparatus showing a support frame for the canopy.

Referring to FIG. 13, a canopy 200 may be operatively associated with the trailer 20. In the embodiment depicted in FIG. 13, the canopy 200 is operatively associated with a canopy support frame 202, which is operatively associated with the containment wall 25. Referring to FIG. 14, for this depicted embodiment, vertical members 204 of the canopy support frame 202 are inserted into receiving apertures in the top portion of the containment wall 25 adapted to receive the vertical members 204; the canopy 200 (shown in FIG. 13) is generally supported on arcuate horizontal members 206 of the canopy support frame 202; and the arcuate horizontal members 206 are connected at each end to the ends of vertical members 204 or horizontal members 208 of the canopy support frame 202. As shown in FIG. 13, the canopy 200 may generally provide cover over the surface area of the fluid containment region, thereby helping to reduce the amount of rain or snow that falls into the fluid containment region. The surface of the canopy 200 may have a generally arcuate shape as shown in FIG. 13 or may have other shapes including an inverted "V" shape or a combination of an arcuate shape and "V" (e.g., upper portion may be arcuate and lower portion may have straight lines like a "V"). The canopy 200 may be removable from trailer 20 or may be permanently fixed to the trailer 20. The edges of the canopy 200 may overlap the containment wall 25. The edges of the canopy 200 may extend below the upper elevation of the containment wall 25.

Operation of the Mobile Storage and Supply Apparatus

The mobile fluid storage and supply apparatus 2 may be transported to a desired, predetermined location at a site by operatively associating the hitch 21 with a motorized vehicle and driving the motorized vehicle to the location. Before transporting the mobile fluid storage and supply apparatus 2 to the location, the fluid storage and supply container 10 may be filled with a fluid such as fuel, gasoline, oil, or water. Alternatively, the fluid storage and supply container 10 may be filled after reaching the location or may be filled at any point during transit to the location. The fluid storage and supply container 10 may be filled using the fluid inlet 100 of the fluid storage and supply container 10. After filling the fluid storage and supply container 10, the lockable inlet cap 102 may be closed and locked to prevent the fluid storage and supply container 10 from being filled with fluid by an unauthorized party.

Upon reaching the location, the hitch 21 can be detached from the motorized vehicle. The stanchions 23 can be adjusted to orient the fluid storage and supply container 10 to a desired orientation relative to the ground as referenced above. The hitch 21, the hitch support 124, or the hitch 21 and the hitch support 124 may also be detached from the trailer to inhibit movement of the fluid storage and supply container 10 from the location.

Motorized machines such as tractors, backhoes, other construction vehicles, generators, or power tools may be supplied at the location with fluid from the fluid storage and supply container 10. The fluid supplied from the fluid storage and supply container 10 could be any fluid required to keep the motorized machines in operating order including fuel, motor oil, gasoline, windshield washer fluid, or water. Generally, a conduit such as the hose 31 can be operatively associated the fluid outlet 110 of the fluid storage and supply container 10 and a fluid inlet of the motorized machine to supply fluid to the motorized machine from the fluid storage and supply container 10. Once the motorized machine has been supplied with fluid from the fluid storage and supply container 10, the conduit can be disassociated from the motorized machine, thereby allowing the motorized machine to move away from the location of fluid storage and supply container 10.

After some time, the filling of motorized machines with fluid from the fluid storage and supply container 10 will reduce the supply of fluid contained within the fluid storage and supply container 10. Periodically, the fluid storage and supply container 10 may be refilled at the location with fluid from another mobile fluid tank.

It may also be desirable to move the fluid storage and supply container 10 to a second predetermined location at the site. To move the fluid storage and supply container 10, any locked stanchions 23 are unlocked. The stanchions 23 will generally be raised off the ground to permit the trailer 20 to move freely. As required, the hitch 21 and the hitch support 124 are attached to the trailer 20. The hitch 21 may be operatively associated with a motorized vehicle and transported to the second predetermined location. Upon reaching the second predetermined location, the hitch 21 may be detached from the motorized vehicle. The hitch 21, the hitch support 124, or both may be detached from the trailer 20. The stanchions 23 can be adjusted to orient the fluid storage and supply container 10 to a desired orientation relative to the ground. One or more of the stanchions 23 may be locked to inhibit movement of the fluid storage and supply container 10 from the second predetermined location. Supplying motorized machines with fluid from the fluid storage and supply container 10 may proceed in a similar manner as described above.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

What is claimed is:

1. A mobile fluid storage and supply apparatus comprising:
a fluid storage and supply container;
a trailer including a bed and a containment wall and supporting the fluid storage and supply container;
the containment wall connected to the bed and surrounding at least a first portion of the fluid storage and supply container, the containment wall and the bed defining an open fluid containment region around the fluid storage and supply container for at least partially containing a fluid leak from the fluid storage and supply container, wherein at least a second portion of the fluid storage and supply container extends above the open fluid containment region; and
a filter in fluid communication with the open fluid containment region and a pump.

2. The mobile fluid storage and supply apparatus of claim 1, further comprising at least one stanchion operatively associated with the trailer for use in orienting the fluid storage and supply container to a desired orientation relative to the ground when the trailer is stationary.

3. The mobile fluid storage and supply apparatus of claim 2, wherein the fluid and supply container is oriented to be substantially level.

4. The mobile fluid storage and supply apparatus of claim 2, wherein at least one of the at least one stanchion can be locked.

5. The mobile fluid storage and supply apparatus of claim 2, wherein at least one of the at least one stanchion is operatively associated with a grounding member.

6. The mobile fluid storage and supply apparatus of claim 1, wherein the trailer includes a hitch adapted to be selectively detachable from the trailer.

7. The mobile fluid storage and supply apparatus of claim 1, wherein the fluid storage and supply container includes a fluid inlet operatively associated with a lockable inlet cap.

8. The mobile fluid storage and supply apparatus of claim 1, wherein the fluid storage and supply container includes a fluid outlet operatively associated with a hose.

9. A mobile fluid storage and supply apparatus comprising:
   a fluid storage and supply container;
   a trailer including a bed and a containment wall and supporting the fluid storage and supply container;
   the containment wall connected to the bed and surrounding at least a first portion of the fluid storage and supply container, the containment wall and the bed defining an open fluid containment region around the fluid storage and supply container for at least partially containing a fluid leak from the fluid storage and supply container, wherein at least a second portion of the fluid storage and supply container extends above the open fluid containment region;
   wherein the fluid storage and supply container includes a fluid outlet operatively associated with a hose; and
   the hose is operatively associated with a grounding member.

10. The mobile fluid storage and supply apparatus of claim 1, further comprising at least one drain valve operatively associated with the open fluid containment region.

11. The mobile fluid storage and supply apparatus of claim 1, further comprising a fire extinguisher attached to the trailer.

12. The mobile fluid storage and supply apparatus of claim 1, further comprising a retractable cable ground operatively associated with the trailer.

13. The mobile fluid storage and supply apparatus of claim 1, further comprising a padlock storage container operatively associated with the trailer.

14. The mobile fluid storage and supply apparatus of claim 1, further comprising at least one changeable placard operatively associated with the trailer.

15. A mobile fluid storage and supply apparatus comprising:
   a fluid storage and supply container;
   a trailer including a bed and a containment wall and supporting the fluid storage and supply container;
   the containment wall connected to the bed and surrounding at least a first portion of the fluid storage and supply container, the containment wall and the bed defining an open fluid containment region around the fluid storage and supply container for at least partially containing a fluid leak from the fluid storage and supply container, wherein at least a second portion of the fluid storage and supply container extends above the open fluid containment region; and
   a global location system operatively associated with the trailer.

16. The mobile fluid storage and supply apparatus of claim 15, wherein the global location system includes a global positioning receiver configured to communicate with a central tracking station.

17. The mobile fluid storage and supply apparatus of claim 16, wherein the central tracking station is configured to provide an alert when a position of the trailer indicated by the global location system differs from an expected location of the trailer.

18. The mobile fluid storage and supply apparatus of claim 1, further comprising a power plug operatively associated with the trailer.

19. The mobile fluid storage and supply apparatus of claim 1, further comprising a canopy operatively associated with the trailer.

* * * * *